(12) United States Patent
Duan et al.

(10) Patent No.: US 12,537,276 B1
(45) Date of Patent: *Jan. 27, 2026

(54) NONLINEAR TRANSMISSION LINE (NLTL) WITH CONTROLLABLE HARMONIC OUTPUT POWER SPECTRUM

(71) Applicant: Northrop Grumman Systems Corporation, Falls Church, VA (US)

(72) Inventors: Dah-Weih Duan, Redondo Beach, CA (US); Elizabeth T. Kunkee, Redondo Beach, CA (US); Kenneth F. Sato, Redondo Beach, CA (US); Kwok K. Loi, Redondo Beach, CA (US); Mansoor K. Siddiqui, Redondo Beach, CA (US); Minhdao D. Truong, Redondo Beach, CA (US); Wesley W. Chan, Redondo Beach, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 157 days.

This patent is subject to a terminal disclaimer.

(21) Appl. No.: 18/383,916

(22) Filed: Oct. 26, 2023

(51) Int. Cl.
*H01P 3/08* (2006.01)
(52) U.S. Cl.
CPC ..................... *H01P 3/08* (2013.01)
(58) Field of Classification Search
CPC ......... H01P 3/08; H01P 1/005; H03D 9/0608; H03D 9/0633
See application file for complete search history.

(56) References Cited

U.S. PATENT DOCUMENTS

| | | | | |
|---|---|---|---|---|
| 3,287,621 | A * | 11/1966 | Weaver | H03B 19/05 327/119 |
| 5,352,994 | A * | 10/1994 | Black | H10D 84/01 257/E27.012 |
| 8,466,845 | B2 | 6/2013 | Elsallal et al. | |
| 2007/0222534 | A1* | 9/2007 | Hannah | H01P 3/003 333/20 |
| 2008/0246551 | A1* | 10/2008 | Noujeim | H03K 5/12 327/170 |
| 2018/0331655 | A1* | 11/2018 | Prager | H03B 9/143 |

OTHER PUBLICATIONS

"Non-Linear Transmission Line Comb Generators Part-2: Solutions to the Low Phase Noise Problem", Jul. 1, 2022, 4 pages.
Breitbarth et al., "Spectral Performance and Noise Theory of Nonlinear Transmission Line Frequency Multipliers", 2017 IEEE, pp. 261-264.
Fairbanks et al., "A Review of Nonlinear Transmission Line System Design", Apr. 12, 2023, EEE Journals & Magazine IEEE Xplore, vol. 8, 17 pages.
Liou, "On-Chip Spiral Inductors for RF Applications: An Overview", Journal of Semiconductor Technology and Science, Sep. 2004, 20 pages.

(Continued)

*Primary Examiner* — Sam K Ahn
*Assistant Examiner* — Amneet Singh
(74) *Attorney, Agent, or Firm* — Dority & Manning, P.A.

(57) ABSTRACT

A nonlinear transmission line (NLTL) comprises a plurality of interconnected transmission line cells, each including a shunt path and a transmission line length wherein the shunt path includes a varactor diode and an inductor coupled in series with the varactor diode.

14 Claims, 11 Drawing Sheets

(56) References Cited

OTHER PUBLICATIONS

Rodwell et al., "GaAs Nonlinear Transmission Lines for Picosecond Pulse Generation and Millimeter-Wave Sampling", IEEE Transactions on microwave theory and techniques, vol. 39, No. 7, Jul. 1991.
Sawdai et al., "GaAs Schottky Varactor Diode Optimization for High-Performance Nonlinear Transmission Lines", TRW Inc, Space & Electronics Group, 1991, (pp. 87-88).

* cited by examiner

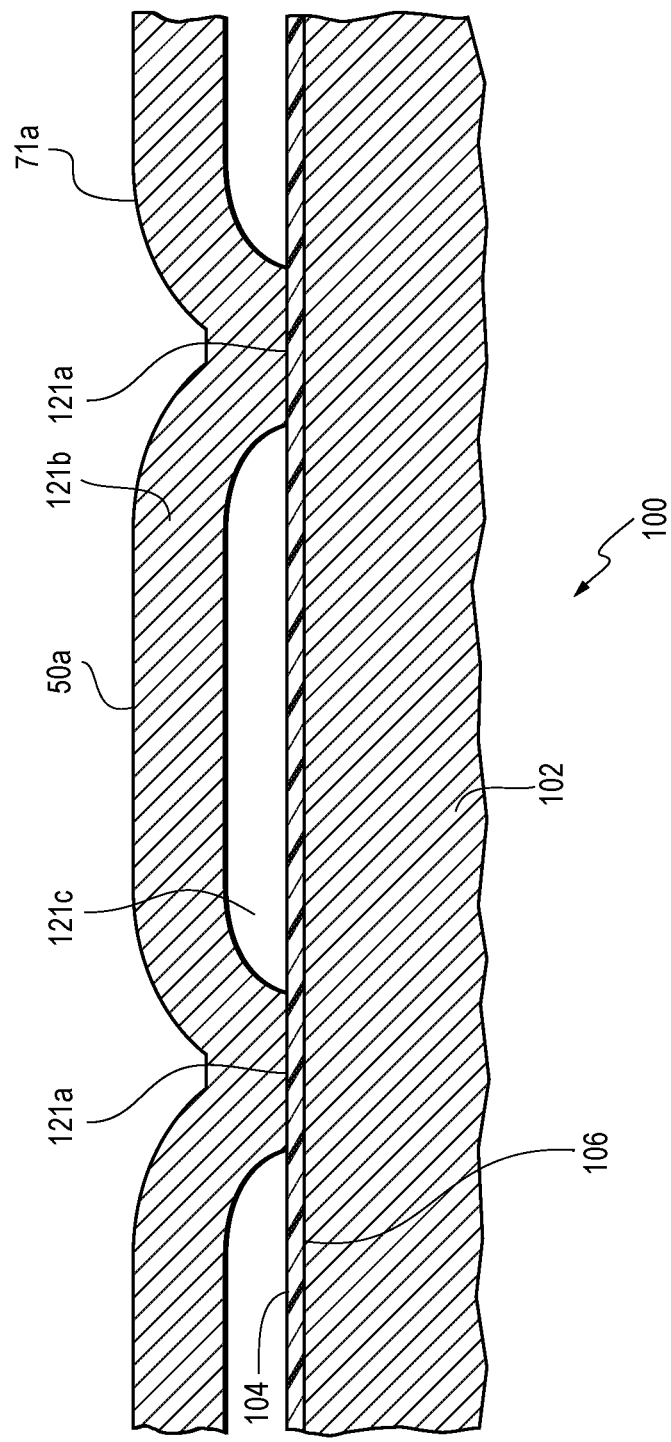

NONLINEAR TRANSMISSION LINE (NLTL) WITH CONTROLLABLE HARMONIC OUTPUT POWER SPECTRUM

FIELD OF DISCLOSURE

The present subject matter relates to radio frequency (RF) circuits, and more particularly to a nonlinear transmission line (NLTL).

BACKGROUND

RF circuits often use frequency multipliers in the form of a comb generator to develop multiple RF frequencies for particular uses, such as to develop stable reference signal correlated to a base frequency signal. A comb generator is realized by a NLTL having a set of N unit cells each comprising a shunt branch and a transmission line length. Each shunt branch includes a nonlinear device in the form of a varactor diode. When driven by an RF waveform (or tone) at a fundamental frequency, a comb filter develops a frequency spectrum that includes a strong leak-through of the fundamental frequency and decreasing power with increasing harmonic index N according to, for example, $-20*\log_{10}(N)$. The fundamental frequency and some lower harmonics are undesired and must be eliminated. Proper elimination of these components often requires wide-band diplexers that may be considerably more difficult to design than filters. On the other hand, higher harmonics at, for example, the $10^{th}$ to $20^{th}$ harmonics, are often desirable. While the output power spectrum can be improved by controlling transmission line parameters and attending to component design, one cannot eliminate the problem of decreasing output power with increasing harmonic index. The low power magnitudes of the desired harmonics result in the need for stringent filtering and amplification to render such frequencies useful for subsequent RF signal processing.

SUMMARY

According to one aspect, a nonlinear transmission line (NLTL) comprises a plurality of interconnected transmission line cells, each including a shunt path and a transmission line length wherein the shunt path includes a varactor diode and an inductor coupled in series with the varactor diode.

According to another aspect, a nonlinear transmission line (NLTL) comprises a plurality of interconnected transmission line cells, each including a shunt path coupled to a transmission line length wherein the shunt path includes a varactor diode and an inductor coupled in series with the varactor diode, wherein at least some of the varactor diodes are of a different size than remaining varactor diodes and wherein at least some of the inductors have different inductive values than remaining inductors.

According to yet another aspect, a nonlinear transmission line (NLTL) comprises a plurality of interconnected transmission line cells, each including a shunt path coupled to a transmission line length wherein the shunt path includes a varactor diode and an inductor coupled in series with the varactor diode, wherein at least some of the varactor diodes are of a different size than remaining varactor diodes. Further, at least some of the inductors have different inductive values than remaining inductors and the transmission line lengths are all equal. Still further, each transmission line length is formed by one of a number of conductive traces and the conductive traces all have equal widths.

Other aspects and advantages will become apparent upon consideration of the following detailed description and the attached drawings wherein like numerals designate like structures throughout the specification.

BRIEF DESCRIPTION OF THE DRAWINGS

FIGS. 13-15 are enlarged, fragmentary, sectional views of portions of a diode, inductor, and via of the chip of FIG. 7 with FIG. 14 being taken generally along the lines 14-14 of FIG. 12.

DETAILED DESCRIPTION

Figure 1:
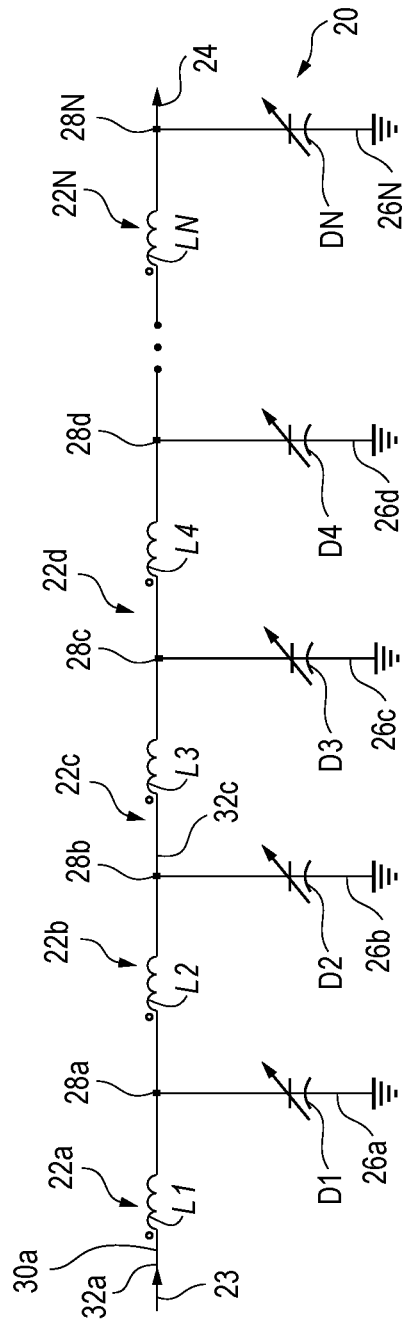
FIG. 1 is a schematic diagram of a comb generator implemented by an idealized NLTL as known in the prior art.

FIG. 1 shows a prior art comb generator implemented by a conventional nonlinear transmission line (NLTL) 20. The NLTL 20 comprises a plurality of cascaded unit cells 22a, 22b, . . . , 22N coupled between an input 23 and an output 24. In an embodiment, the unit cells 22a-22N are identical to one another, and hence only the unit cell 22a will be described in detail herein. The unit cell 22a includes a shunt path 26a coupled between a source of voltage potential, such as ground, and a junction 28a. A nonlinear element in the form of a varactor diode D1 (illustrated in FIG. 1 as a variable capacitor) is coupled in series in the shunt path 26a. A transmission line portion or length 30a is coupled between an input port 32a and the junction 28a. The portion 30a has an impedance represented by an inductor L1.

With the exception of the unit cells 22a and 22N, the unit cells 22b, 22c, . . . , 22N-1 are interconnected by coupling a junction 28 of a unit cell 22, for example, a junction 28b of the unit cell 22b, to an input port 32 of a next succeeding unit cell 22, for example, the input port 32c of the unit cell 22c. In the case of the unit cell 22a, the input port 32a is located at the input 23 of the NLTL 20 whereas in the case of the unit cell 22N, a junction 28N corresponding to the junction 28a of the unit cell 22a is disposed at the output 24 of the NLTL 20.

Figure 2:
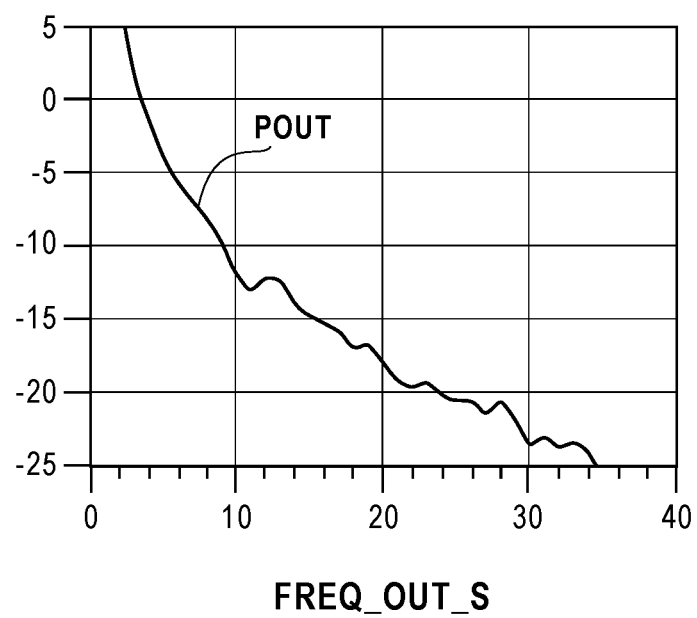
FIG. 2 is a graph of output power versus frequency of the prior art comb generator of FIG. 1.

FIG. 2 illustrates output power POUT of the NLTL 20 of FIG. 1 as a function of frequency. As seen in FIG. 2, output power Pour resulting from supply of a 1 GHz. input tone at 18 dBm input decreases with increasing harmonic index.

Thus, for example, Pour is at a significant positive or zero magnitude at the fundamental frequency up to approximately the second harmonic and drops to approximately −13 dBm at the $10^{th}$ harmonic, approximately −18 dBm at the $20^{th}$ harmonic, approximately −24 dBm at the $30^{th}$ harmonic, and so on. These characteristics result in the need to use a diplexer or other complex circuitry to eliminate the fundamental and undesirable lower-order harmonics and to filter and amplify the output power at the higher frequencies to render such frequencies suitable for use.

Figure 3:
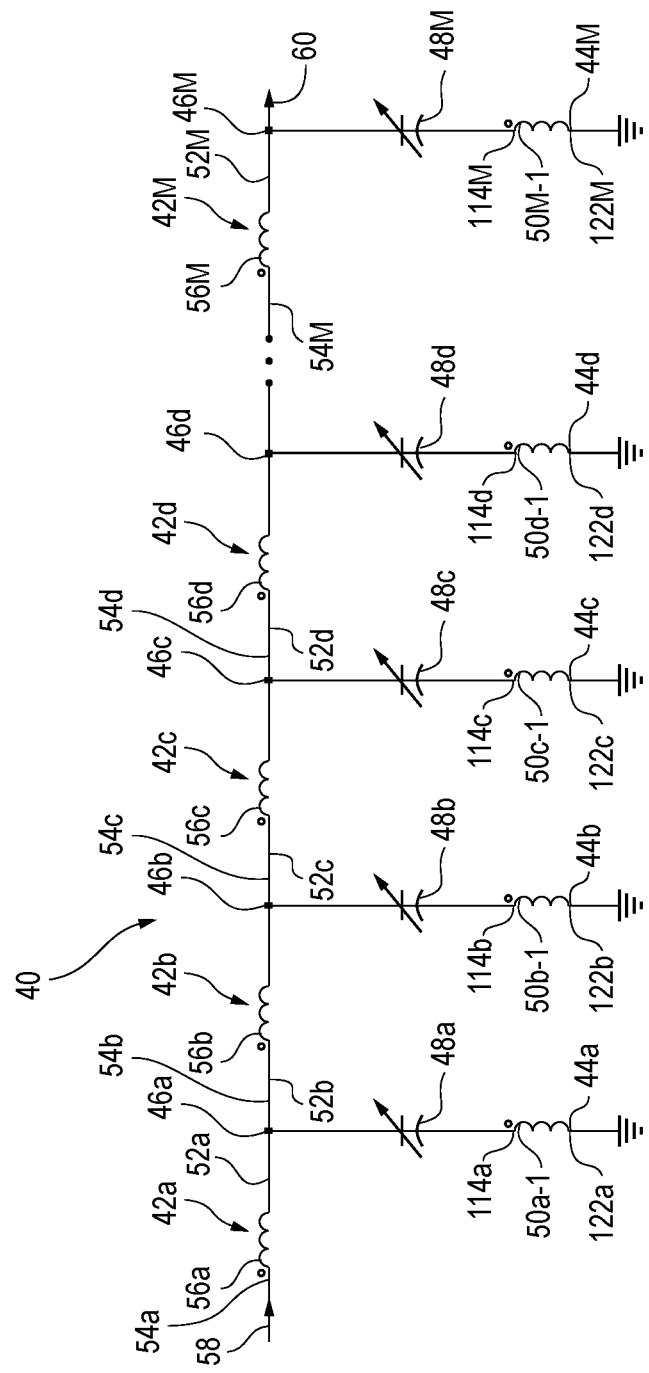
FIG. 3 is a schematic diagram of an idealized NLTL according to the present disclosure.
Figure 4:
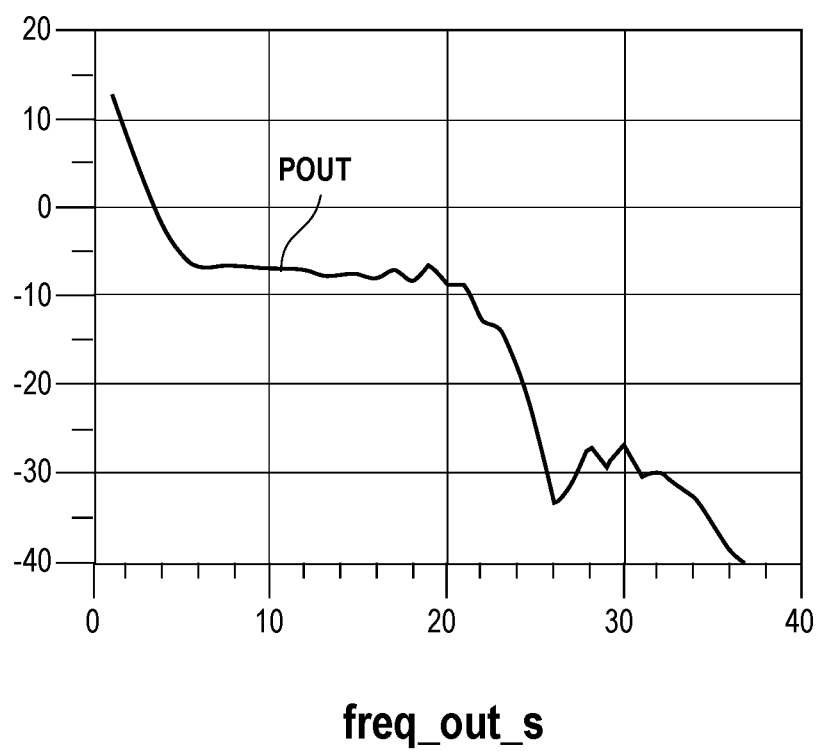
FIG. 4 is a graph of output power versus frequency of the NLTL of FIG. 3.

FIG. 3 illustrates an embodiment that exhibits a desirable flattened POUT characteristic according to the graph of FIG. 4. With specific reference to FIG. 3, a comb filter implemented by an NLTL 40 comprises a plurality of M (which may be the same or different than N) cascaded transmission line cells 42a, 42b, . . . , 42M (the cells 42 are referred to as "transmission line cells" rather than "unit cells" inasmuch as, noted in greater detail hereinafter, the cells 42 are not identical to one another). Each transmission line cell 42, for example, the transmission line cell 42a, comprises a shunt path 44a coupled between a source of voltage potential, such as ground, and a junction 46a. In the illustrated embodiment, a nonlinear device comprising a varactor diode 48a is coupled in series with a first end 50a-1 of a shunt path inductor 50a in the shunt path 44a. A main transmission line portion or length 52a is coupled between an input port 54a and the junction 46a. The portion 52a has an impedance represented by an inductor 56a.

The transmission line cells 42b, 42c, . . . , 42M-1 are interconnected by coupling a junction 46 of a transmission line cell 42, for example, a junction 46b of the transmission line cell 42b, to an input port 54 of a next succeeding transmission line cell 42. Thus, for example, the input port 54c of the transmission line cell 42c is coupled to the junction 46b. In the case of the transmission line cell 42a, the input port 54a is located at an input 58 of the NLTL 40 whereas in the case of the transmission line cell 42M, a junction 46M corresponding to the junction 46a of the transmission line cell 42a is disposed at an output 60 of the NLTL 40.

In an embodiment, the transmission line cells 42a, 42b, . . . , 42M are identical in terms of inclusion and arrangement of elements; however, the inductance values, and hence, the impedances, of the inductors 50 and the design of the diodes 48; specifically, the sizes, and hence the capacitances of the diodes, may vary among transmission line cells 42. The diodes 48 and the inductance values of the inductors 50 are tuned or optimized to obtain a flattened frequency spectrum POUT similar or identical to that shown in FIG. 4 in which the harmonic output power stops decreasing and instead remains at approximately the same level (plus or minus 1 dB) throughout a desired range of, for example, the $6^{th}$ through $20^{th}$ harmonics. The added shunt path inductor 50 in each shunt path 44 helps to resonate out the "static" part of the capacitance of the diode 48 and allows more signal to be used in the "variable" part of the capacitance of the diode.

In an embodiment, each varactor diode 48 may (but need not) comprise a hyper-abrupt junction diode, for example as disclosed in a paper by D. Sawdai, et al, "GaAs Schottky varactor diode optimization for high-performance nonlinear transmission lines," $60^{th}$ Digest Device Research Conference, p. 87, wherein the entire contents of such paper are hereby incorporated by reference herein.

The flattened harmonic output in the desired range reduces the complexity and cost of downstream components/electronics that filter and amplify components of POUT.

Figure 5:
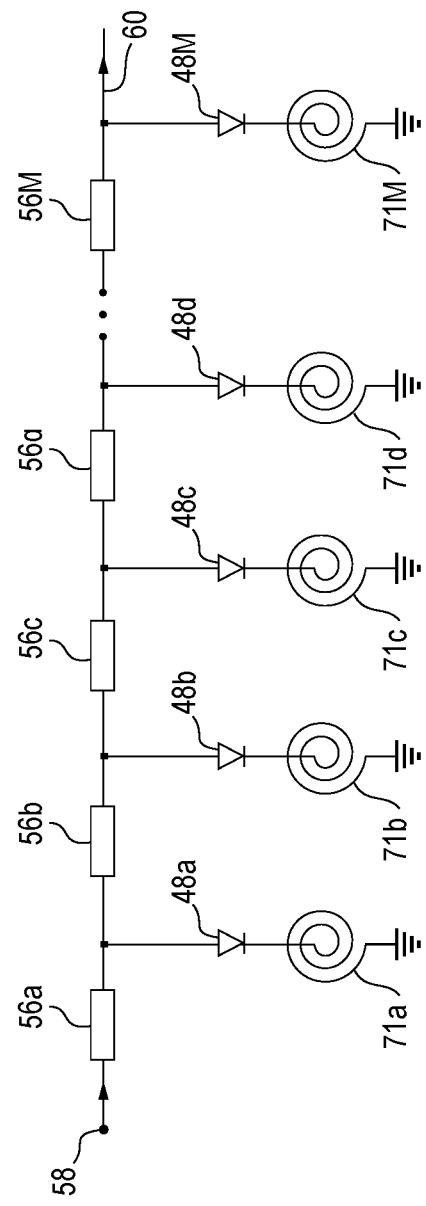
FIGS. 5 and 6 are schematic diagrams of implementations of the NLTL of FIG. 3
Figure 6:
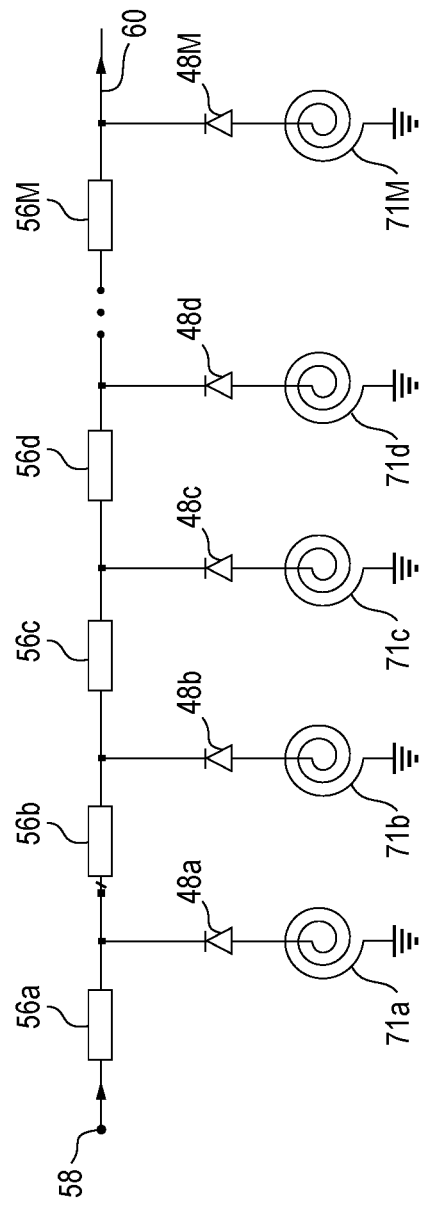

FIG. 5 illustrates an embodiment in which the inductors 50 of FIG. 3 are implemented by spiral inductors 71a, 71b, . . . , 71M. FIG. 6 illustrates an embodiment in which the diodes 48a, 48b . . . , 48M are connected in an opposite polarity compared to FIGS. 3 and 5. The embodiment of FIG. 6 may be used when the bias of the input signal is opposite the bias of the input signal supplied to the embodiment of FIG. 5. Specifically, the DC bias voltage in FIG. 5 is negative, say, −0.6 V while that in FIG. 6 is positive, say, +0.6 V so that the diodes are nominally reverse biased in both cases. In the embodiment of FIGS. 5 and 6, a DC bias may be applied to the diodes 48 via the input signal as described above, or the DC bias may be applied via the output of the NLTL. Spiral inductors may be circular, rectangular, octagonal, hexagonal, or any other $N_0$-sided figure, where $N_0$ is an integer greater than zero. Also, a spiral inductor may have an integer number of windings or a fractional number of windings, as required for the inductance to be realized.

Figure 8:
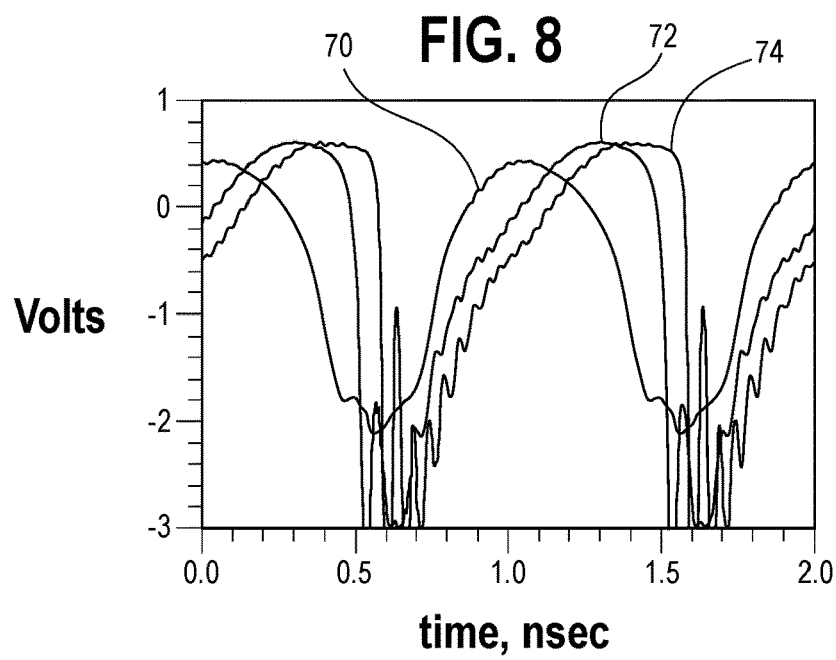
FIG. 8 is a series of waveform diagrams illustrating compression undertaken by the NLTL of FIG. 3.

The lengths and widths of the traces forming the interconnecting main transmission line portions between the shunt paths impact frequency development. All of the main transmission line portions may have different lengths and/or widths or some or all of the main transmission line portions may have the same length and width. Still further, one or more of the trace widths may vary in size in one or more of the individual main transmission line portions. In an embodiment, the lengths of traces forming the interconnecting main transmission line portions are all equal to 476 micrometers and the widths of the traces forming the main transmission line portions are all constant over the line portions and equal to 15 micrometers. A design procedure to obtain an initial value of a main transmission line portion length is disclosed in a paper by J. Breitbarth and Z. Popovic, "Spectral Performance and Noise Theory of Nonlinear Transmission Line Frequency Multipliers," 2017 Joint EFTF/IFCS, p. 261, wherein the entire contents of such paper is incorporated by reference herein. In general, the main transmission line portions interact with the diode capacitances to provide an input impedance match to 50 ohms, and contribute some waveform compression for the initially sinusoidal signal travelling down the NLTL 40 so that after a plurality of shunt paths the waveform is gradually compressed to saw-tooth-like shape, which is full of harmonics, to accomplish comb generation. Such compression is shown in FIG. 8 for the case M=30 of FIG. 3, which illustrates increasing slope magnitudes and rates of change of the waveform at the first (i.e., left-most) diode 48a, illustrated as waveform 70, compared to the fifteenth diode at the center of the NLTL 40, illustrated by waveform 72, and the thirtieth diode 48M at the right-hand end of the NLTL 40, illustrated by waveform 74. Basically, the design procedure begins with the C-V curve (depending on diode doping profile) of a diode of a "typical" diameter, for example, 15 micrometers, and use such information to identify the impedance match, the power of the input tone, the diode bias voltage, the lengths of interconnecting lines, and the number of cells of the NLTL to obtain a design starting point assuming that all diode are of the typical diameter. Thereafter, during design refinement, diode sizes and inductor lengths are varied along the NLTL and the lengths of interconnecting lines, the number of cells, and the line widths are adjusted in order to achieve improved harmonic performance.

Figure 9:
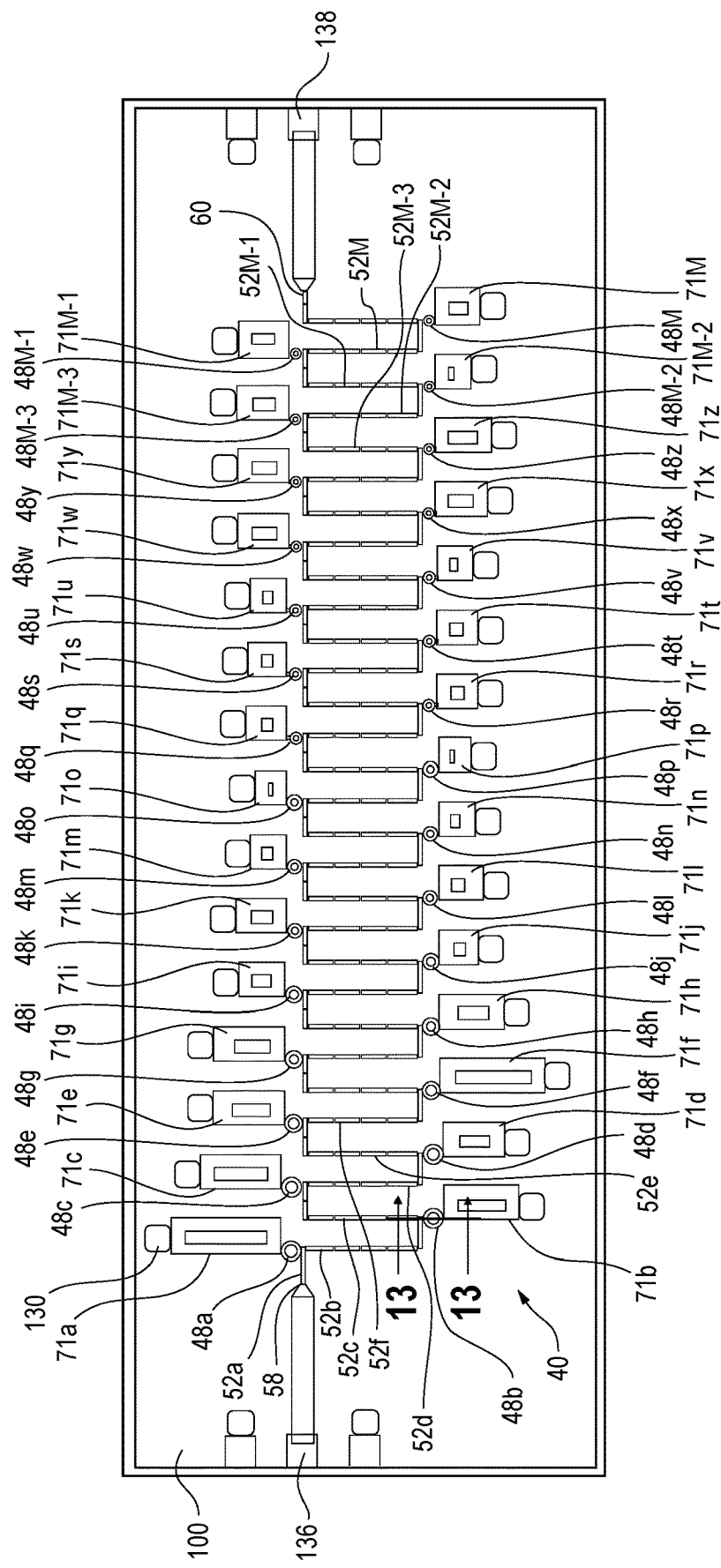
FIG. 9 is a plan view of a chip implementing the NLTL of FIG. 3.
Figure 10:
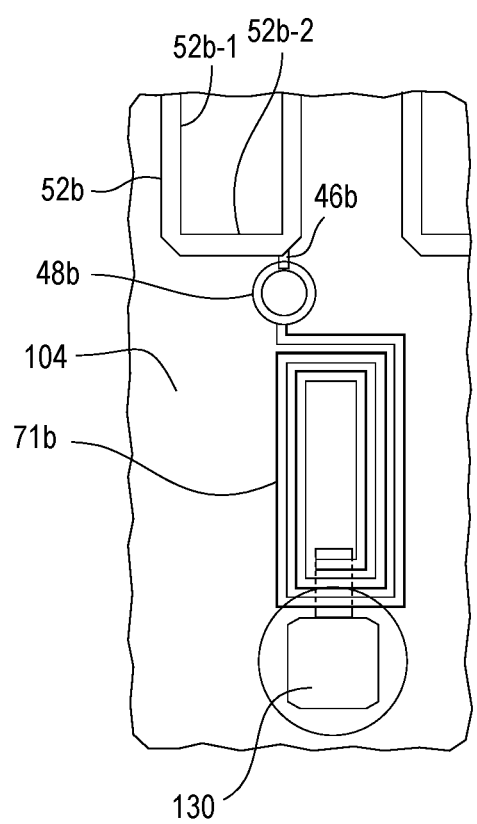
FIG. 10 is an enlarged, fragmentary, plan view of a portion of the chip of FIG. 9.
Figure 13:
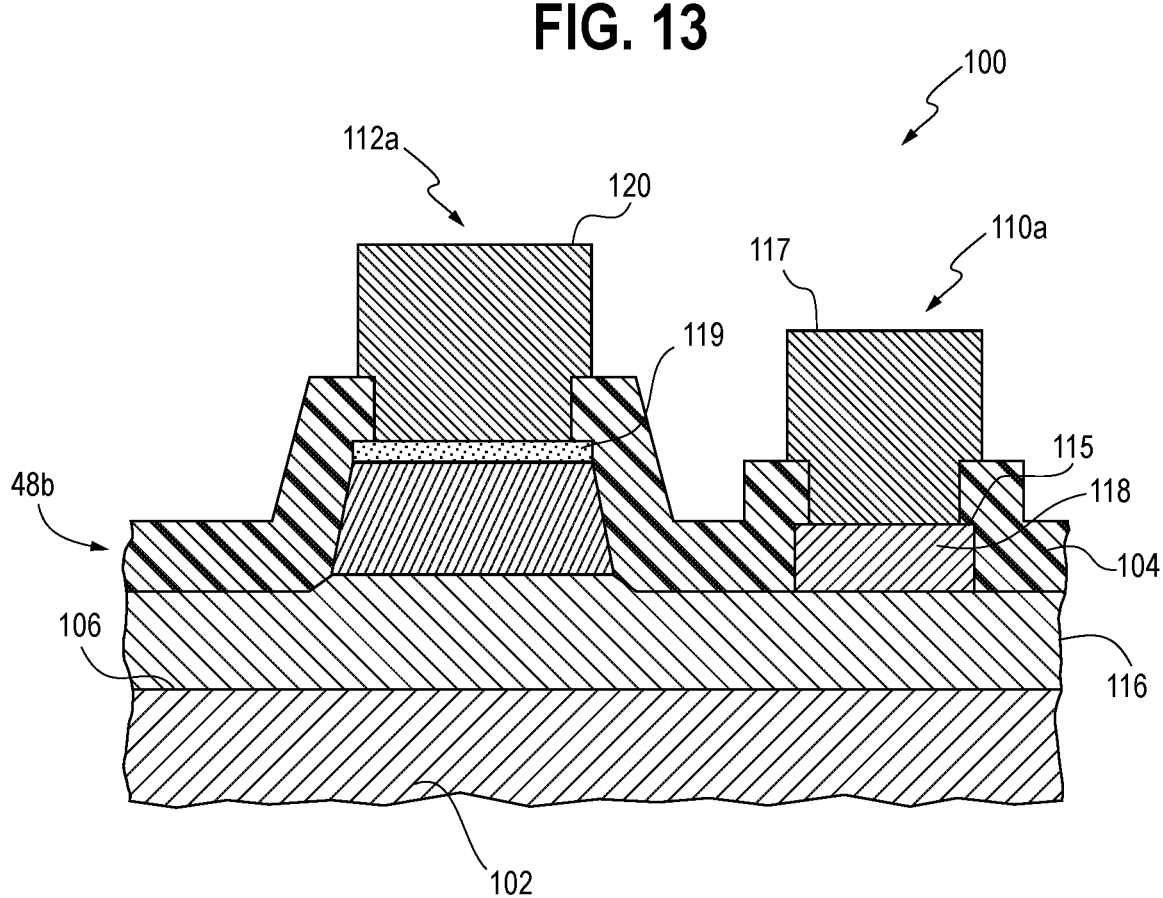

Referring next to FIG. 9, a chip 100 that implements an example of the NLTL 40 is illustrated. FIG. 13 illustrates the vertical stack-up of the chip 100. The chip 100 comprises a semi-insulating substrate 102 that may comprise, for example, a 4 mil GaAs planar member. A dielectric layer 104 is formed at least in part on an upper surface 106 of the substrate 102. Various components are formed on the substrate 102 and/or dielectric layer 104 comprising the diodes 48, the inductors 50, and the main transmission line portions 52. In the illustrated embodiment, the various elements on the chip 100 are interconnected with one another by conductive traces. Specifically, each of the main transmission line portions 52, for example, the line portion 52*b* as seen in FIG. 10, comprises segments 52*b*-1 and 52*b*-2 formed by conductive traces disposed on the dielectric layer 104 wherein the segments 52*b*-1 and 52*b*-2 are disposed at an angle, such as 90 degrees, with respect to one another. The main transmission line portions 52*a*-52M are arranged in a back-and-forth fashion at a center portion of the substrate 102 and the diodes 48 and inductors 71 are disposed at outer portions of the substrate 102. A compact chip 100 is thus obtained.

The diodes 48 are of similar or identical construction to one another, except possibly as to size, and hence, only the diode 48*a* will be described in detail herein. As shown in FIGS. 3 and 13, the diode 48*a* includes a cathode 110*a* coupled to the junction 46*a* and an anode 112*a* coupled to a first end 114*a* of the inductor 50*a*. Each cathode 110 includes a cathode contact (FIG. 13) 115 disposed in contact between a subcathode layer 116 and a first interconnect 117 made of a suitable electrically conductive metal. For example, the cathode contact 115 and the subcathode layer 116 could be made of an AuGeNiAu metal alloy and a highly Si-doped GaAs epi layer, respectively. A cathode layer 118 is disposed in contact atop the subcathode layer 116 and an anode layer 119 is disposed in contact atop the cathode layer 118. The cathode layer 118 and the anode layer 119 are made of semiconductor materials that are doped to obtain the desired diode operating characteristics. A second interconnect 120 made of a suitable electrically conductive metal is disposed in contact atop the anode layer 119. The first interconnect 117 and the second interconnect 120 comprise the cathode and anode, respectively, of the diode 48 and are connected by conductive traces between the junction 46*a* and the inductor 71*a* on the chip 100.

Figure 11:
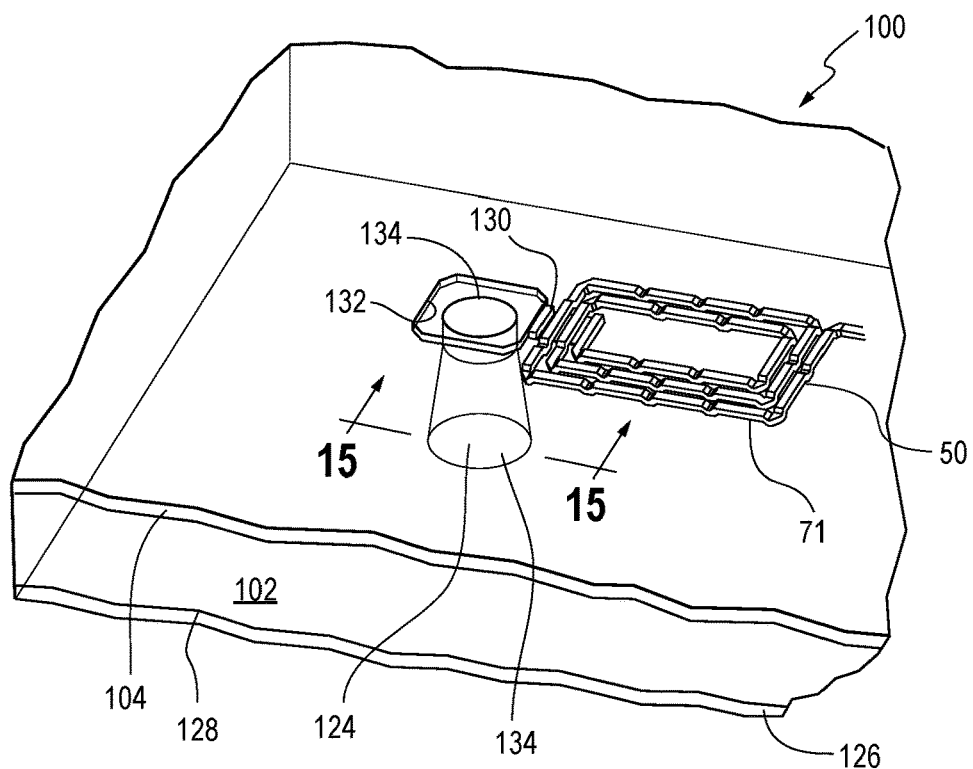
FIG. 11 is an enlarged, fragmentary, isometric view taken from above and with portions shown as transparent of the chip of FIG. 9.
Figure 12:
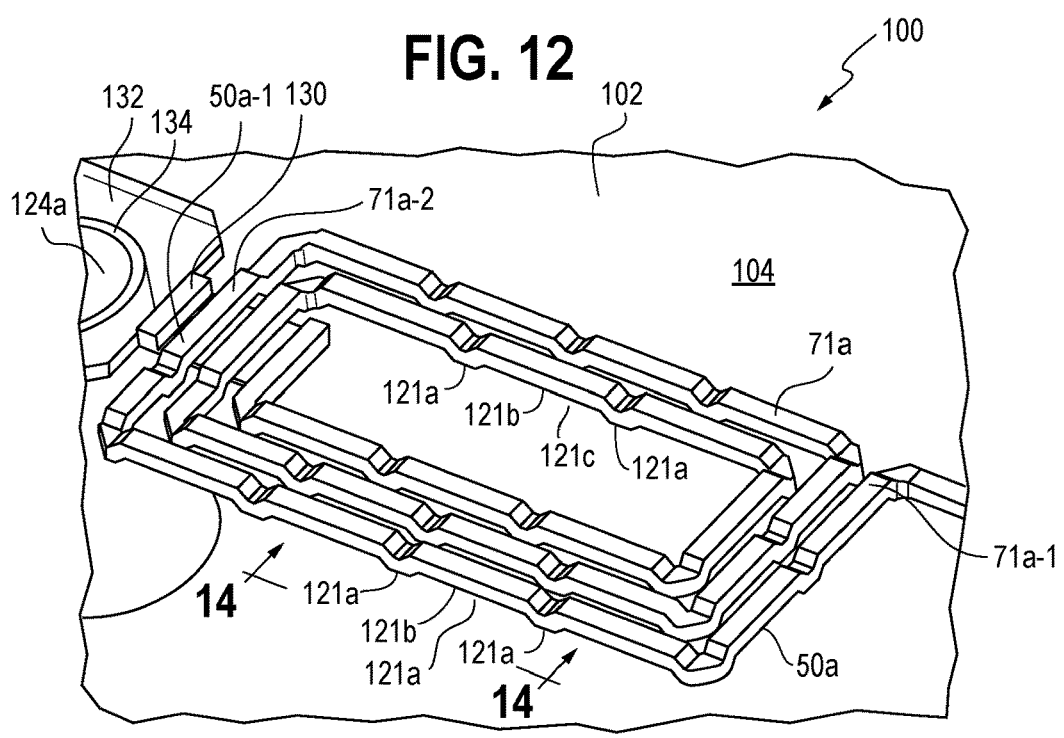
FIG. 12 is an enlarged, fragmentary, isometric view taken from above and with portions shown as transparent of the chip of FIG. 9.

The inductors 71 are also of similar or identical construction to one another, and hence, only the inductor 71*a* will be described in detail herein. Referring also to FIGS. 11, 12, and 14, the inductor 71*a* includes first portions 121*a* of inductor turns in contact with and disposed on the dielectric layer 104 on a first side of the chip 100 and second portions 121*b* of inductor turns between the first portions 121*a* that are disposed above the substrate 102 and the dielectric layer 104 such that a space 121*c* is formed between each second portion and the dielectric layer 104. Thus, a majority of each spiral inductor 71 comprising the second portions 121*b* thereof is air-bridged, i.e., a majority of the metal line sections forming each inductor 71 are raised above the upper or front surface of the chip 100 (i.e., above the dielectric layer 104) by about 3.5 micrometer. This is to increase the Q factor (i.e., lower the loss) of the spiral inductor and push the self-resonance frequency higher.

Figure 15:
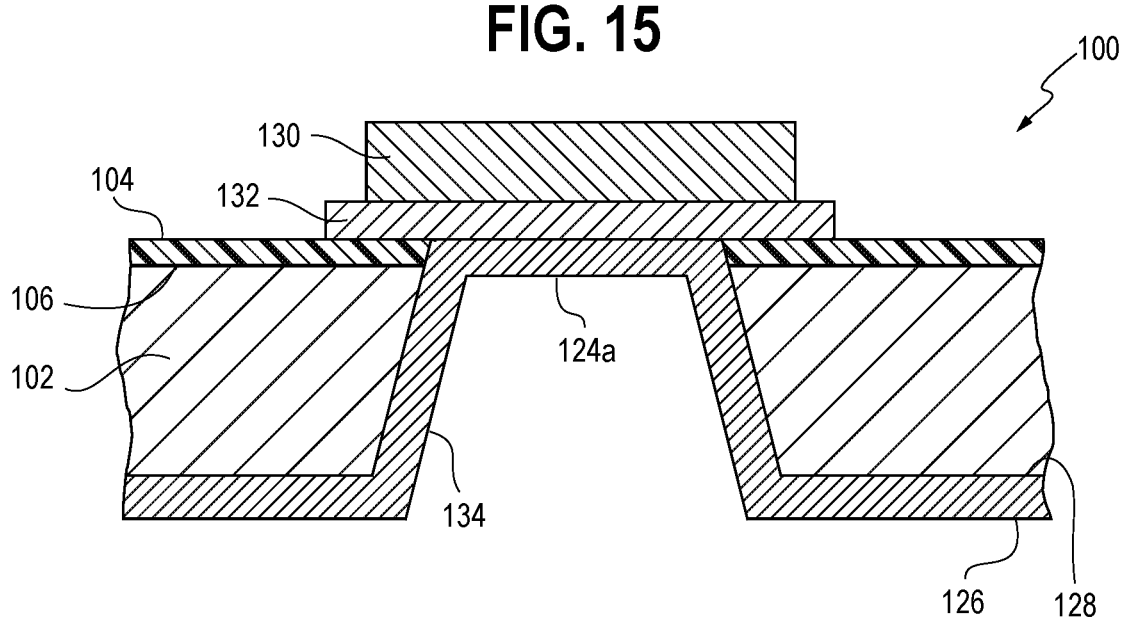

In the illustrated embodiment, the first ends 71*a*-1, 71*b*-1, . . . , 71M-1 corresponding to the ends 114*a*, 114*b*, 114*c*, . . . , 114M, respectively (FIG. 3) of the inductors 71*a*, 71*b*, . . . , 71M, respectively, are coupled directly to the diodes 48*a*, 48*b*, . . . , 48M, respectively, and second ends 71*a*-2, 71*b*-2, . . . , 71M-2 corresponding to the ends 122*a*, 122*b*, . . . , 122M (FIG. 3) of the inductors 71*a*, 71*b*, . . . , 71M are coupled by similar or identical conductive vias 124*a*, 124*b*, . . . , 124M, respectively, to a conductive ground plane 126 disposed on a back side 128 of the chip 100. Inasmuch as the vias 124 are identical to one another only the via 124*a* will be described in detail herein. As seen in FIGS. 12 and 15, a second end 71*a*-2 of an inductor 71*a* is coupled by a top metal portion 130 (also seen in FIG. 9) and an interconnect metal portion 132 to a tapered metal via portion 134 that extends through the dielectric layer 104 and the substrate 102. The tapered via portion 134 is integral with the ground plane 126.

In the illustrated embodiment of FIG. 9, input and output connectors 136, 138 are coupled to the input 58 and the output 60 of the NLTL 40, respectively.

By way of example, and not for purposes of limitation, estimated values of the components shown in FIG. 9 in which M=30 may be as follows (in the tables that follow diode sizes are specified in micrometers (µm) and refer to the diode diameter as shown in FIG. 9 and other FIGS., diode capacitance values are specified in picofarads (pF) and are measured at a reverse bias voltage of $V_d=-0.6$ volts, turns refer to the number of conductor turns making up the respective inductor, lengths (and other linear dimensions) are specified in µm and refer to the length e.g., the long dimension of the area enclosed by the inductor turns (or other respective linear dimension), and the inductive values are specified in nanohenries (nH):

TABLE 1

| Diode | Diameter | Cap. Value | Inductor | Turns | Length | Ind. Value |
|---|---|---|---|---|---|---|
| 48a | 40 | 1.007 | 71a | 2.5 | 269.999 | 1.982 |
| 48b | 40 | 1.007 | 71b | 2.5 | 154.906 | 1.307 |
| 48c | 35 | 0.761 | 71c | 2.5 | 183.521 | 1.475 |
| 48d | 35 | 0.761 | 71d | 2.5 | 104.031 | 1.009 |
| 48e | 25 | 0.381 | 71e | 2.5 | 147.618 | 1.264 |
| 48f | 25 | 0.381 | 71f | 2.5 | 244.080 | 1.83 |
| 48g | 25 | 0.381 | 71g | 2.5 | 151.126 | 1.285 |
| 48h | 25 | 0.381 | 71h | 2.5 | 111.985 | 1.056 |
| 48i | 25 | 0.381 | 71i | 2.5 | 69.662 | 0.808 |
| 48j | 25 | 0.381 | 71j | 2.5 | 37.524 | 0.619 |
| 48k | 20 | 0.245 | 71k | 2.5 | 80.946 | 0.874 |
| 48l | 20 | 0.245 | 71l | 2.5 | 56.893 | 0.733 |
| 48m | 20 | 0.245 | 71m | 2.5 | 50.231 | 0.694 |
| 48n | 20 | 0.245 | 71n | 2.5 | 34.851 | 0.604 |
| 48o | 20 | 0.245 | 71o | 2.5 | 26.493 | 0.555 |
| 48p | 20 | 0.245 | 71p | 2.5 | 18.132 | 0.506 |
| 48q | 15 | 0.142 | 71q | 2.5 | 54.394 | 0.718 |
| 48r | 15 | 0.142 | 71r | 2.5 | 54.899 | 0.721 |
| 48s | 15 | 0.142 | 71s | 2.5 | 53.415 | 0.712 |
| 48t | 15 | 0.142 | 71t | 2.5 | 49.977 | 0.692 |
| 48u | 15 | 0.142 | 71u | 2.5 | 41.285 | 0.641 |
| 48v | 15 | 0.142 | 71v | 2.5 | 37.280 | 0.618 |
| 48w | 10 | 0.065 | 71w | 2.5 | 85.954 | 0.903 |
| 48x | 10 | 0.065 | 71x | 2.5 | 89.879 | 0.926 |
| 48y | 10 | 0.065 | 71y | 2.5 | 90.000 | 0.927 |
| 48z | 10 | 0.065 | 71z | 2.5 | 88.455 | 0.918 |
| 48M-3 | 10 | 0.065 | 71M-3 | 2.5 | 84.448 | 0.894 |
| 48M-2 | 10 | 0.065 | 71M-2 | 2.5 | 30.040 | 0.575 |
| 48M-1 | 10 | 0.065 | 71M-1 | 2.5 | 77.767 | 0.855 |
| 48M | 10 | 0.065 | 71M | 2.5 | 65.250 | 0.782 |

Further, in an embodiment, the width of each area enclosed by a set of inductor turns (i.e., in the side-to-side dimension as seen in FIGS. 9 and 10) is 48 µm.

Figure 7:
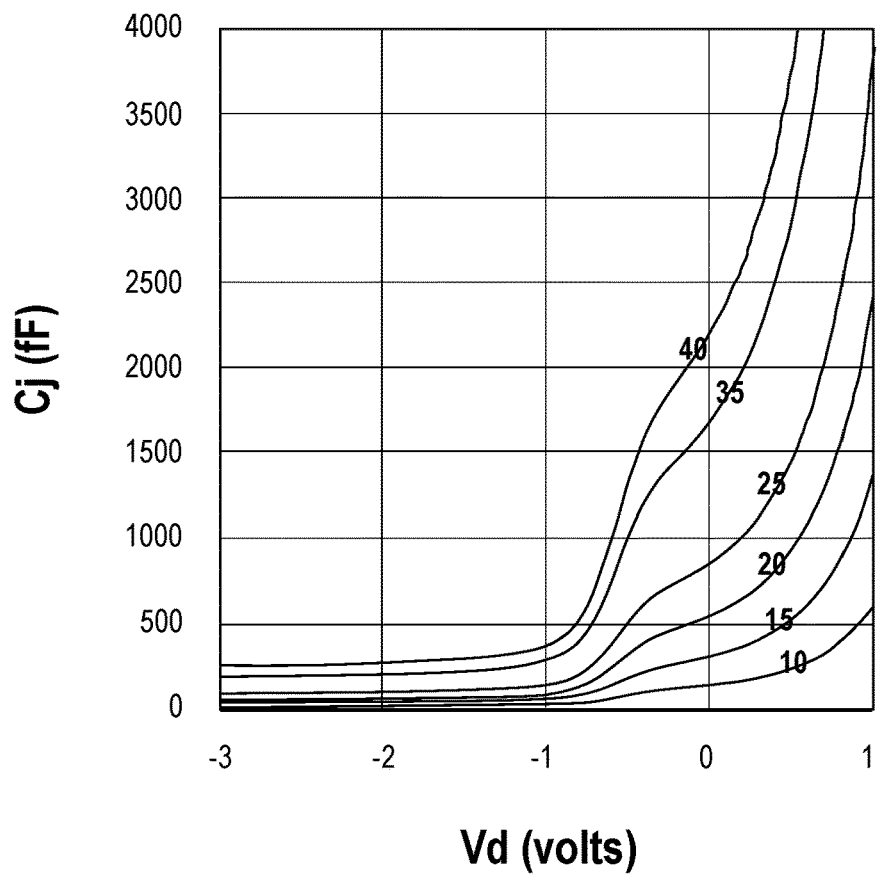
FIG. 7 is a graph of capacitance versus voltage for each of the diodes of FIG. 3.

FIG. 7 comprises a graph of six curves 69*a*-69*f* representing reverse bias voltage Vd versus capacitance in femtofarads (fF) for the diodes 48 of FIG. 9 summarized in Table 1 above of sizes 40 mm, 35 mm, 25 mm, 20 mm, 15 mm, and 10 mm, respectively.

Except as described otherwise herein, the various elements are interconnected by conductive traces that are formed on or in the various chips disclosed herein.

INDUSTRIAL APPLICABILITY

In summary, the NLTL as disclosed herein develops controllable magnitudes of harmonic components as compared to known NLTLs. Embodiments disclosed herein re-shape the strong $-20*\log_{10}(N)$ lower-index harmonics, and generate arbitrary selected frequencies in, for example, band-pass fashion.

Even with the same circuit topology, same number of diodes, same input frequency, and same target harmonic frequencies, two circuits will have different optimized component values if the diode bias voltage or the input RF power are different.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar references in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Numerous modifications to the present disclosure will be apparent to those skilled in the art in view of the foregoing description. It should be understood that the illustrated embodiments are exemplary only, and should not be taken as limiting the scope of the disclosure.

We claim:

1. A nonlinear transmission line (NLTL), comprising:
a plurality of interconnected transmission line cells disposed on a substrate, each transmission line cell including
a shunt path coupled to a transmission line length wherein the shunt path includes a varactor diode and an inductor coupled in series with the varactor diode;
wherein the interconnected transmission line cells are carried by the substrate to form a chip;
wherein a dielectric layer is disposed on a surface of the substrate and each inductor includes a first portion disposed on the dielectric layer and a second portion spaced from the dielectric layer and the substrate; and
wherein an end of each inductor is coupled by a via to a ground plane of the chip.

2. The NLTL of claim 1, wherein the transmission line lengths are all equal.

3. The NLTL of claim 1, wherein at least some of the varactor diodes are DC biased and are of a different size than remaining varactor diodes.

4. The NLTL of claim 3, wherein the varactor diodes are coupled in a first polarity when the DC bias has a first level and are coupled in a second polarity when the DC bias has a second level.

5. The NLTL of claim 1, wherein at least some of the inductors have different inductive values than remaining inductors.

6. The NLTL of claim 1, wherein each transmission line length is formed by one of a number of conductive traces.

7. The NLTL of claim 6, wherein the conductive traces all have equal widths.

8. The NLTL of claim 1, wherein each inductor comprises a spiral inductor formed on the chip.

9. A nonlinear transmission line (NLTL), comprising:
a plurality of interconnected transmission line cells, each including
a shunt path coupled to a transmission line length wherein the shunt path includes a varactor diode and an inductor coupled in series with the varactor diode, wherein at least some of the varactor diodes are of a different size than remaining varactor diodes and wherein at least some of the inductors have different inductive values than remaining inductors;
wherein the interconnected transmission line cells are carried by a substrate to form a chip, wherein a dielectric layer is disposed on a surface of the substrate, and wherein each inductor includes a first portion disposed on the dielectric layer and a second portion spaced from the dielectric layer and the substrate; and
wherein an end of each inductor is coupled by a via to a ground plane of the chip.

10. The NLTL of claim 9, wherein the transmission line lengths are all equal.

11. The NLTL of claim 9, wherein each transmission line length is formed by one of a number of conductive traces.

12. The NLTL of claim 11, wherein the conductive traces all have equal widths.

13. A nonlinear transmission line (NLTL), comprising:
a plurality of interconnected transmission line cells, each including
a shunt path coupled to a transmission line length wherein the shunt path includes a varactor diode and an inductor coupled in series with the varactor diode, wherein at least some of the varactor diodes are of a different size than remaining varactor diodes, wherein at least some of the inductors have different inductive values than remaining inductors, wherein the transmission line lengths are all equal, wherein each transmission line length is formed by at least one of a number of conductive traces, and wherein the conductive traces all have equal widths; and
wherein the interconnected transmission line cells are carried by a substrate to form a chip, wherein a dielectric layer is disposed on a surface of the substrate, and wherein each inductor includes a first portion disposed on the dielectric layer and a second portion spaced from the dielectric layer and the substrate.

14. The NLTL of claim 13, wherein an end of each inductor is coupled by a via to a ground plane of the chip.

* * * * *